(12) United States Patent
Arai

(10) Patent No.: US 9,104,609 B2
(45) Date of Patent: Aug. 11, 2015

(54) INFORMATION PROCESSING APPARATUS, SYSTEM TIME SYNCHRONIZATION METHOD AND COMPUTER READABLE MEDIUM

(71) Applicant: Hiroki Arai, Tokyo (JP)

(72) Inventor: Hiroki Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 136 days.

(21) Appl. No.: 13/846,090

(22) Filed: Mar. 18, 2013

(65) Prior Publication Data

US 2013/0262913 A1 Oct. 3, 2013

(30) Foreign Application Priority Data

Mar. 29, 2012 (JP) ................................. 2012-075806

(51) Int. Cl.
*G06F 11/00* (2006.01)
*G06F 11/14* (2006.01)
*G06F 1/14* (2006.01)
*G06F 11/20* (2006.01)

(52) U.S. Cl.
CPC .............. *G06F 11/1402* (2013.01); *G06F 1/14* (2013.01); *G06F 11/2038* (2013.01)

(58) Field of Classification Search
USPC ...................................................... 714/2, 12
See application file for complete search history.

(56) References Cited

U.S. PATENT DOCUMENTS

| 2003/0038665 A1* | 2/2003 | Naven ............................ 327/298 |
| 2012/0042195 A1* | 2/2012 | Marinelli et al. ................. 714/3 |
| 2012/0166878 A1* | 6/2012 | Sinha et al. ..................... 714/37 |
| 2013/0103982 A1* | 4/2013 | Chelliah et al. ................. 714/20 |

FOREIGN PATENT DOCUMENTS

| JP | S58064526 A | 4/1983 |
| JP | 1987046020 B2 | 9/1987 |
| JP | 2002175129 A | 6/2002 |
| JP | 2006349364 A | 12/2006 |

* cited by examiner

*Primary Examiner* — Sarai Butler
(74) *Attorney, Agent, or Firm* — Sughrue Mion, PLLC

(57) ABSTRACT

The time in the chipset of backup resources is synchronized easily at the system time.
An information processing apparatus including: an operational chipset which includes a first Real Time Clock (RTC); a backup chipset which includes a second RTC: a third RTC which times system time; a difference time calculation unit which calculates a difference time between a system time periodically notified of from the first RTC of the operational chipset and the system time which the third RTC times; a holding unit which holds the difference time; a calculation unit which calculates a temporary system time which is set to the second RTC of the backup chipset to which a chipset switching operated, based on the system time of the third RTC and the difference time at the time of the chipset switching; and a configuration unit which sets the temporary system time to the second RTC of the backup chipset.

6 Claims, 5 Drawing Sheets

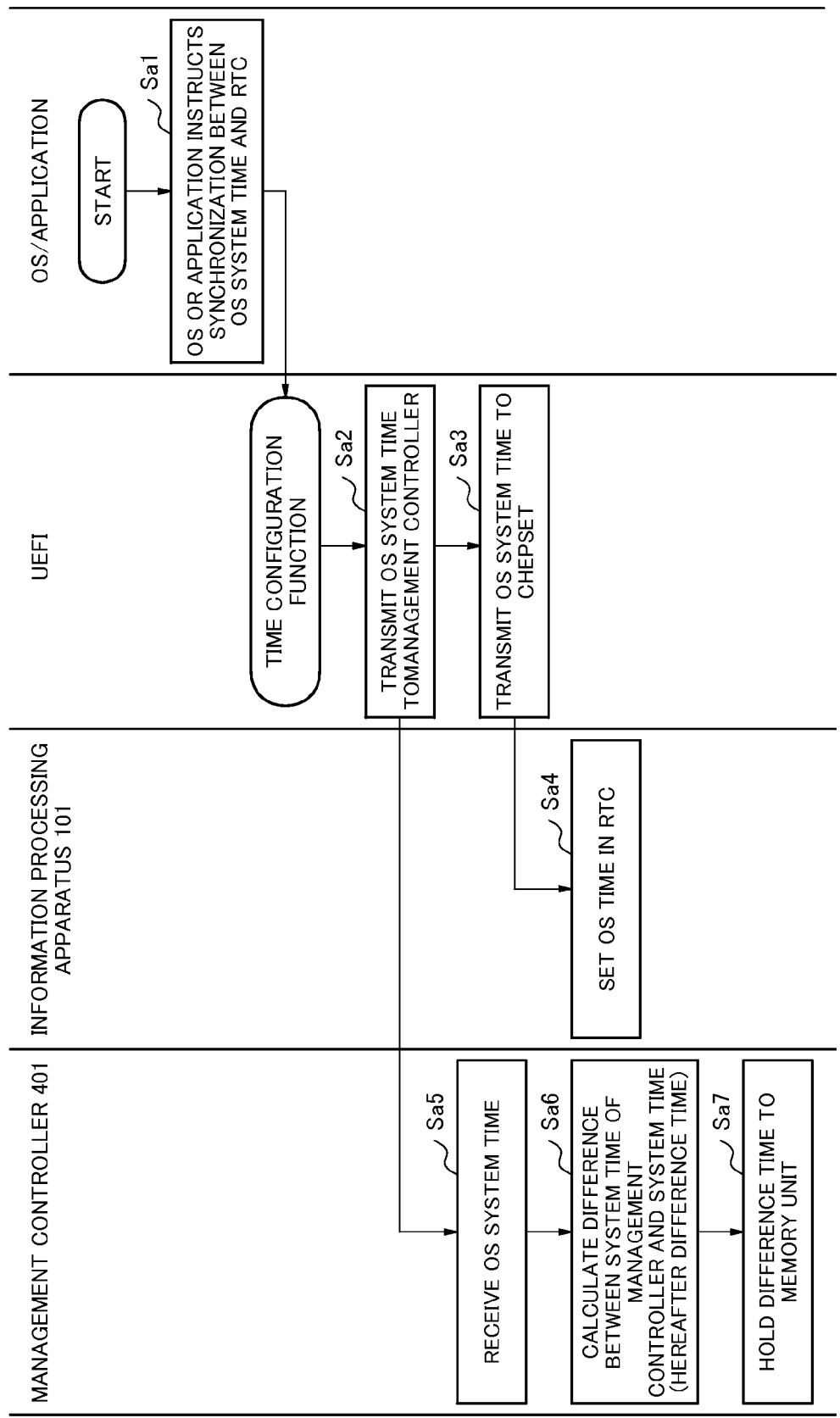

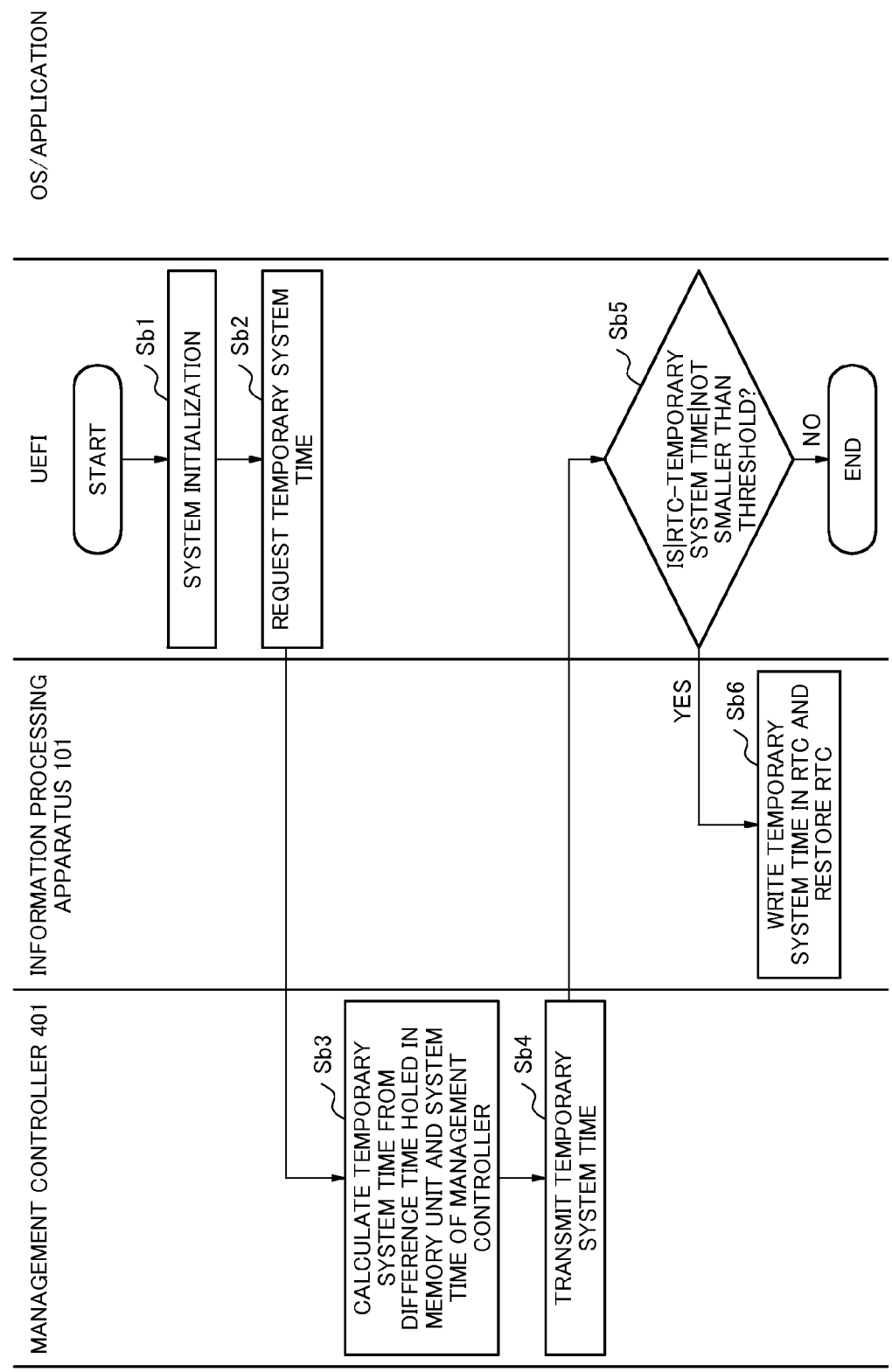

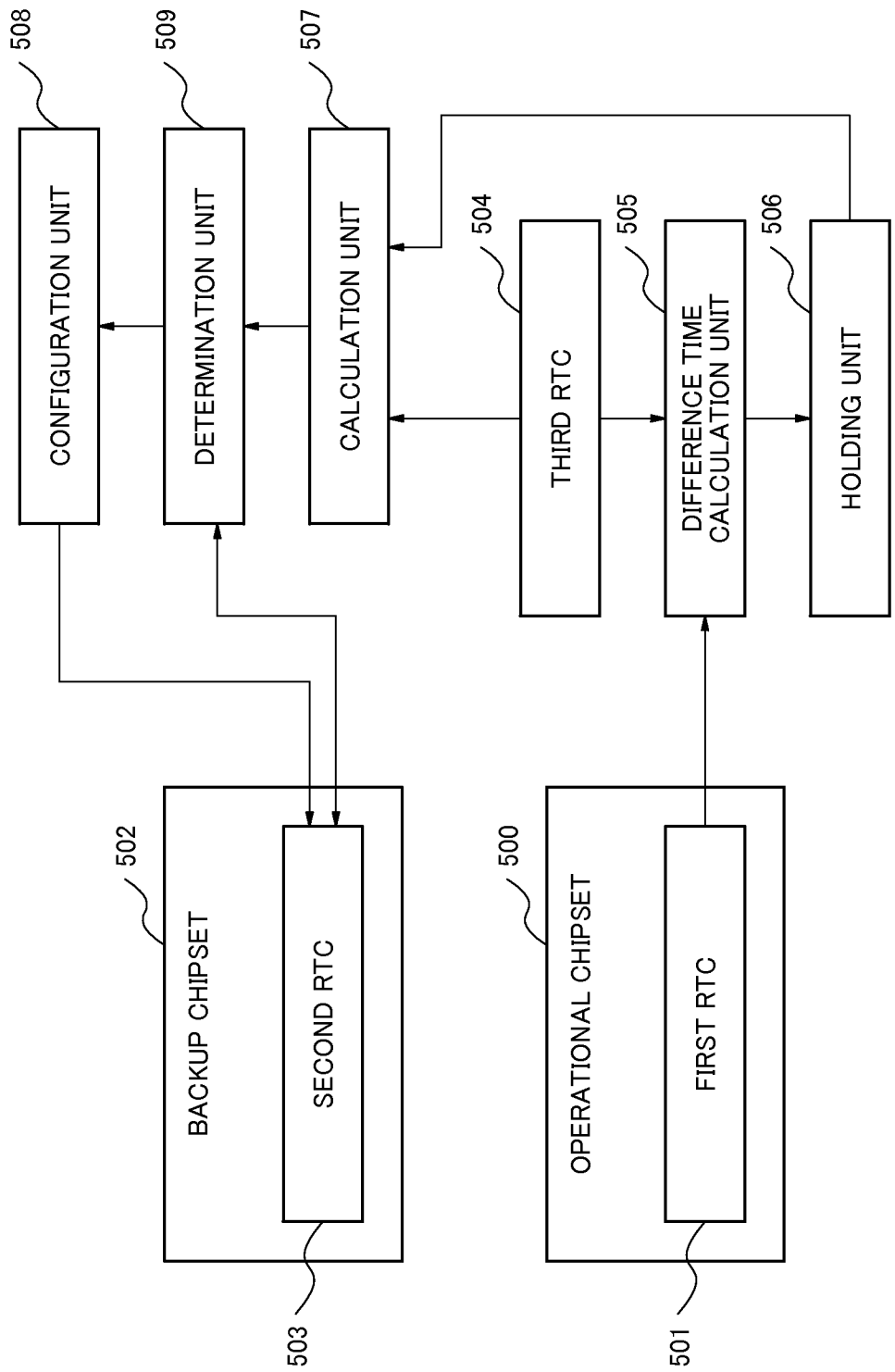

INFORMATION PROCESSING APPARATUS, SYSTEM TIME SYNCHRONIZATION METHOD AND COMPUTER READABLE MEDIUM

INCORPORATION BY REFERENCE

This application is based upon and claims the benefit of priority from Japanese Patent Application No. 2012-075806, filed on Mar. 29, 2012, the disclosure of which is incorporated herein in its entirety by reference.

TECHNICAL FIELD

The present invention relates an information processing apparatus, a system time synchronization method and a recording medium.

BACKGROUND ART

There is an information processing apparatus which is equipped with a plurality of chipsets indispensable for system operation as backup resources in order to improve the availability. Such the information apparatus switches an operation from an operational chipset to a backup chipset so as to prevent a system disable state when a failure occurs in the operational chipset and the system is down.

However, an operating chipset and a backup chipset do not usually synchronize the time of built-in RTC (Real Time Clock). Accordingly, if RTC is not synchronized after the switching of the chipset, system time becomes incorrect. As a result, a variety of problems, such as bad influences for the operation of OS (Operation System) and application, occur. The technology for synchronizing the system time in relation to the present invention will be described below.

For example, a computer disclosed in Japanese Patent Application Laid-Open No. 2002-175129 (hereinafter, patent document 1) does not change the OS time which the operating system manages when the system time is notified to each unit (computer) composing a network. Then, the computer stores the difference value between the system time and the OS time. Then, the computer returns the OS time after adding the difference value to the OS time when an application requests the system time.

And, a multitask system disclosed in Japanese Patent Application Laid-Open No. 2006-349364 (hereinafter, patent document 2) calculates the time difference between the criterion time acquired from an NTP (Network Time Protocol) server of the network and the system time of the built-in timer. Then, the system corrects the system time based on the calculated time difference using a time correction task performed periodically.

And, a computer disclosed in Japanese Patent Application Laid-Open No. 1983-064526 (hereinafter, patent document 3) relates a dual computer system using two computers and synchronizes the time between two computers. Accordingly, the computer writes the time of the timer of the primary computer in an accessible memory periodically from both. Then, when the primary computer has broken down, the computer reads the time from the memory mentioned above and employs it as an initial value at the time.

And, an information processing apparatus disclosed in Japanese Patent Publication No. 1987-046020 (hereinafter, patent document 4) adds the information indicating the time which the self timer function outputs from a information processing apparatus of an active system to the diagnostic information for checking a backup information processing apparatus, and transmits it to the backup information processing apparatus. Then, the backup information processing apparatus of the patent document 4 compares the time added to the received diagnostic information and the time which the self timer function outputs, and corrects so that it may coincidence with the time added to the diagnostic information.

SUMMARY

An exemplary object of the present invention is to provide an information processing apparatus, a management controller and a system synchronization method which can easily synchronize the time of the chipset which is a backup resource to the system time when a failure occurs in the operational chipset and the system is down.

An information processing apparatus of the present invention including: an operational chipset which includes a first Real Time Clock (RTC); a backup chipset which includes a second RTC: a third RTC which times system time; a difference time calculation unit which calculates a difference time between a system time periodically notified of from the first RTC of the operational chipset and the system time which the third RTC times; a holding unit which holds the difference time; a calculation unit which calculates a temporary system time which is set to the second RTC of the backup chipset to which a chipset switching operated, based on the system time of the third RTC and the difference time at the time of the chipset switching; and a configuration unit which sets the temporary system time to the second RTC of the backup chipset.

A system time synchronization method of the present invention for a information processing apparatus including an operational chipset including a first RTC (Real Time Clock), a backup chipset including a second RTC, and a third RTC, including: timing system time by the third RTC; calculating a difference time between a system time periodically notified of from the first RTC of the operational chipset and the system time which the third RTC times; holding the difference time; calculating a temporary system time which is set to the second RTC of the backup chipset to which a chipset switching operated, based on the system time of the third RTC and the difference time at the time of the chipset switching; and setting the temporary system time to the second RTC of the backup chipset.

A computer readable medium embodying a program of the present invention, the program causing a information processing apparatus including an operational chipset including a first RTC (Real Time Clock), a backup chipset including a second RTC, and a third RTC to perform method, the method including: timing system time by the third RTC; calculating a difference time between a system time periodically notified of from the first RTC of the operational chipset and the system time which the third RTC times; holding the difference time; calculating a temporary system time which is set to the second RTC of the backup chipset to which a chipset switching operated, based on the system time of the third RTC and the difference time at the time of the chipset switching; and setting the temporary system time to the second RTC of the backup chipset.

BRIEF DESCRIPTION OF THE DRAWINGS

Exemplary features and advantages of the present invention will become apparent from the following detailed description when taken with the accompanying drawings in which:

FIG. 3 is a flowchart which shows an example of the normal operation of the information processing apparatus according to the first exemplary embodiment.

FIG. 4 is a flowchart which shows an example of the operation at the time of the chipset switching in the information processing apparatus according to the first exemplary embodiment.

FIG. 5 is a block diagram which shows an example of the constitution of a modified example of the information processing apparatus according to the first exemplary embodiment.

EXEMPLARY EMBODIMENT

The present invention realizes the proper system time synchronization between chipsets in the information processing apparatus including a chipset as a backup resources and a management controller such as BMC (Base Management Controller).

In the present invention, in the normal operation, the information processing apparatus periodically acquires the system time from RTC (Real Time Clock) of an operational chipset and notifies the management controller of the system time. The management controller calculates the difference time of the received system time and the system time which the management controller itself has, and holds it.

When a chipset failure occurs and the used chipsets are switched, the information processing apparatus shuts down once, and switches a chipset to be used when starting. Next, in initialization time of the information processing apparatus, the management controller calculates the system time to be rewritten in RTC of the chipset to which a switching operated, by using the system time which the management controller holds and the difference time stored in advance. Then, the information processing apparatus receives the rewritten system time from the management controller, rewrites in RTC of the chipset to which the switching operated, and restores the system time. As a result, the information processing apparatus of the present invention can realize the appropriate synchronization with the system time to which the chipset switching operated.

Hereinafter, an exemplary embodiment of the present invention will be described with reference to a drawing.

Further, each drawing is for describing an exemplary embodiment of the present invention. Therefore, the present invention is not limited to the description on each drawing. And, same numbers are attached to the similar constitution of each drawing, and the description of the repeat may be omitted.

Figure 1:
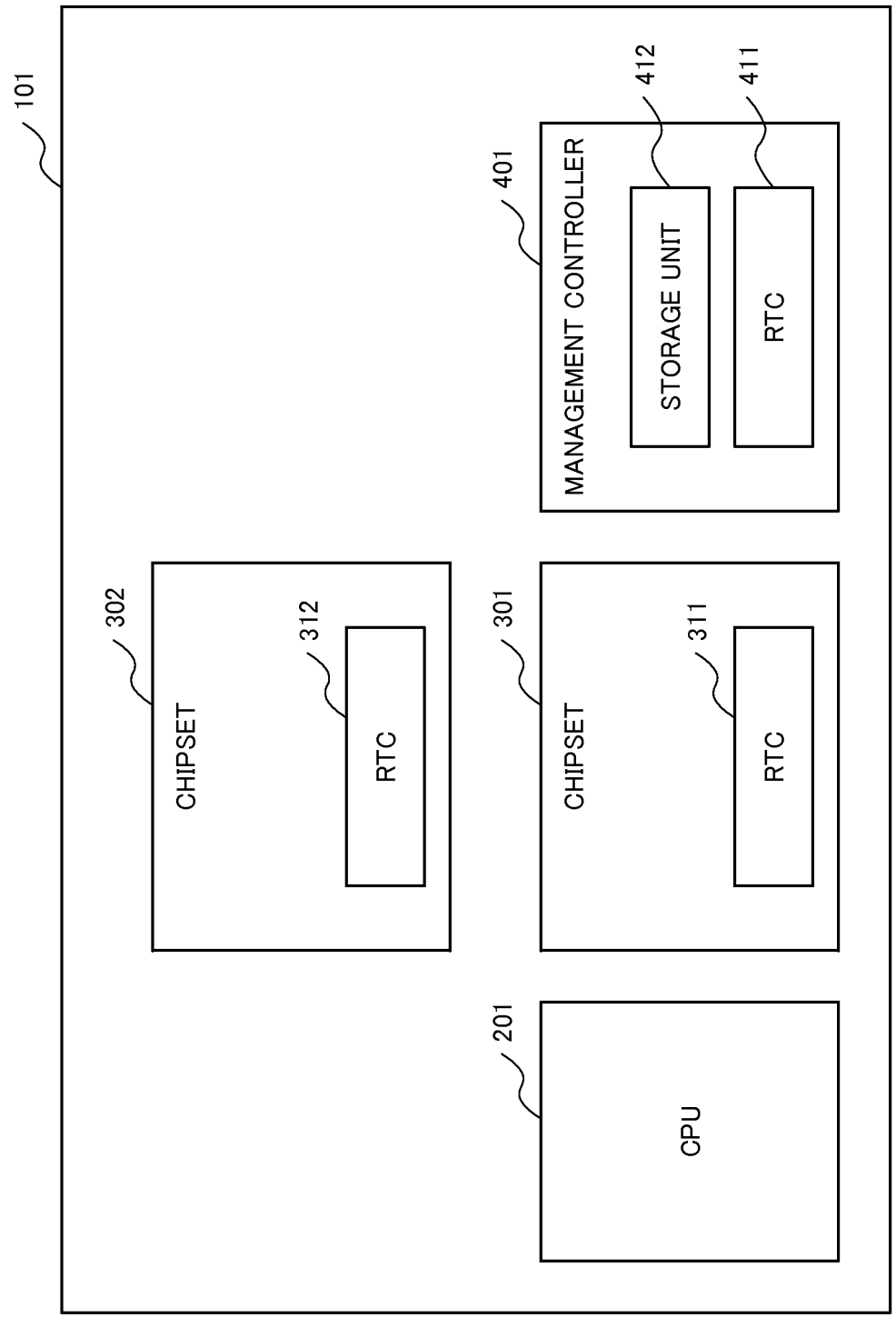
FIG. 1 is a block diagram which shows an example of the constitution of an information processing apparatus according to the first exemplary embodiment of the present invention.

FIG. 1 is a block diagram which shows an example of the constitution of an information processing apparatus 101 according to the first exemplary embodiment of the present invention.

In FIG. 1, the information processing apparatus 101 includes CPU (Central Processing Unit) 201, a chipset 301, a chipset 302 and a management controller 401.

The chipset 301 and the chipset 302 include a RTC 311 and a RTC 312 for holding the system time in the interior respectively.

The management controller 401 which is a BMC or the like, for example, includes a RTC 411 for holding the system time and a memory unit 412 for storing the difference time information.

Figure 2:
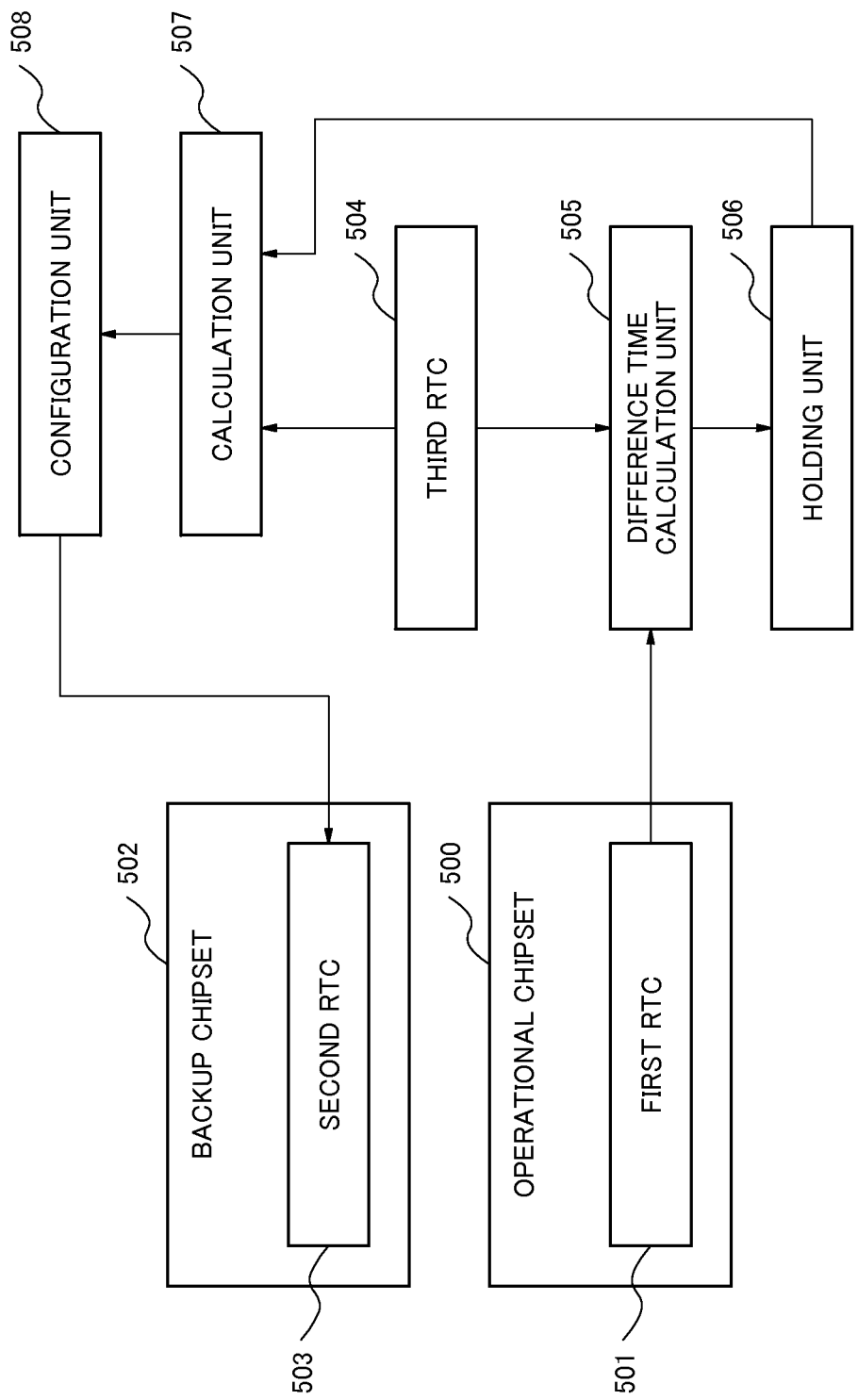
FIG. 2 is a block diagram which shows an example of a functional constitution of the information processing apparatus according to the first exemplary embodiment.

FIG. 2 is a block diagram which shows an example of functional constitution of the information processing apparatus 101 according to this exemplary embodiment.

In FIG. 2, the operational chipset 500 corresponds to the chipset 301 of FIG. 1 and is usually an operational chipset. An operational chipset 500 includes a first RTC 501.

The first RTC 501 corresponds to RTC 311 of FIG. 1.

A backup chipset 502 corresponds to the chipset 302 of FIG. 1, and is a chipset which operates when the operational chipset 500 breaks down. The backup chipset 502 includes a second RTC 503.

The second RTC 503 corresponds to the RTC 312 of FIG. 1.

The third RTC 504 corresponds to RTC 411 of FIG. 1 and times the system time.

A difference time calculation unit 505 calculates the difference time of the system time periodically notified from the first RTC 501 of the operational chipset 500 and the system time which third RTC 504 times.

A holding unit 506 corresponds to the memory unit 412 of FIG. 1 and holds the difference time which the difference time calculation unit 505 calculates.

A calculation unit 507 calculates the temporary system time set to the second RTC 503 of a backup chipset 502 to which the switching operated based on the system time of the third RTC 504 and the difference time which the holding unit 506 holds at the time of the chipset switching such as at the time when failure occurs.

A configuration unit 508 sets the temporary system time which the calculation unit 507 calculates to the second RTC 503 of the backup chipset 502.

The difference time calculation unit 505, the calculation unit 507 and the configuration unit 508 correspond to the function of the management controller 401 of FIG. 1.

And, as shown in FIG. 5, the information processing apparatus 101 of this exemplary embodiment may include a determination unit 509 in addition to the constitution of FIG. 2.

FIG. 5 is a block diagram which shows an example of the constitution of a modification example of this exemplary embodiment.

The determination unit 509 compares the system time of the second RTC 503 of the backup chipset 502 and the temporary system time received from the calculation unit 507. Then, the determination unit 509 instructs the temporary system time in the configuration unit 508 to the temporary system time in the case that the difference between the system time of the second RTC 503 and the temporary system time is not in the predetermined range (the case that the absolute value of the difference, for example, is no smaller than the threshold value).

In other words, the information processing apparatus 101 may set the system time to the second RTC 503 in the case that the difference between the system time of the second RTC 503 and the temporary system time is not in the predetermined range.

Further, for example, the determination unit 509 may be included in a function unit which performs UEFI (Unified Extensible Firmware Interface) service of the information processing apparatus 101.

Next, the operation of the information processing apparatus 101 of this exemplary embodiment will be described.

FIG. 3 is a flowchart which shows an example of the normal operation of the information processing apparatus 101 according to this exemplary embodiment.

The operation indicated in the leftmost field of FIG. 3 is the operation of the management controller 401. The operation of the second field from the left is the operation of the chipset 301 (the operational chipset 500) of the information processing apparatus 101. The operation of the second field from the right is the operation of a function unit (hereinafter, referred to as "UEFI service function unit") which performs UEFI services of the information processing apparatus 101 described below. The operation of the rightmost field is the operation of an OS or an application (hereinafter, referred to as "OS" together) which operate on the CPU 201.

The OS is working on the information processing apparatus 101 in the normal operation time. Periodically, the OS instructs the UEFI service function unit to set the system time of the OS (hereinafter, referred to as "the OS system time") to RTC 311 (first RTC 501) of the chipset 301 (the operational chipset 500) (step Sa1). For example, the time configuration software uses a time configuration function provided in the UEFI service function for the instructions.

The UEFI service function unit which receives the instructions transmits the OS system time to the management controller 401 (step Sa2). And, the UEFI service function unit transmits the OS system time to the chipset 301 (step Sa3). In other words, the chipset 301 (the operational chipset 500) receives the OS system time from the UEFI service function unit.

The chipset 301 sets the received OS system time to RTC 311 (step Sa4).

A management controller 401 (the difference time calculation unit 505) receives the OS system time from the time configuration function of the function unit which performs UEFI service (step Sa5).

Then, the management controller 401 calculates the difference time of the OS system time and the system time of the management controller 401 acquired from its RTC 411 (third RTC 504) (step Sa6).

Then, the management controller 401 holds the difference time in a memory unit 412 (holding unit 506) (step Sa7).

Further, the chipset 301 (the operational chipset 500) and the management controller 401 receive the same OS system time. Therefore, the management controller 401 (the difference time calculation unit 505) may receive the OS system time from the chipset 301 (the operational chipset 500) or RTC 311 (the first RTC 501). In other words, the management controller 401 (the difference time calculation unit 505) may receive the system time from the first RTC of the operational chipset 500.

FIG. 4 is a flowchart which shows an example of the operation at the time of a chipset switching in the information processing apparatus 101 according to this exemplary embodiment.

The operation indicated in the left field of FIG. 4 is the operation of the management controller 401. The operation of the second field from the left is the operation of the chipset 302 (backup chipset 502) of the information processing apparatus 101. The operation of the second field from the right is the operation of the UEFI service function unit. The operation of the rightmost field is the operation of the OS. However, in the operation shown in FIG. 4, the operation of the OS is not included.

When a failure occurs in the chipset 301, the information processing apparatus 101 incorporates the chipset 302 (backup chipset 502) in the system instead of the chipset 301 in which the failure occurs, and restarts and initializes itself.

The UEFI service function unit of the information processing apparatus 101 begins to initialize the information processing apparatus 101 (step Sb1).

In the initialization, the UEFI service function unit requests the temporary system time of the management controller 401 (step Sb2).

The management controller 401 (the calculation unit 507) calculates the temporary system time (the system time+difference time) using the system time of the management controller 401 acquired from its RTC 411 (third RTC 504) and the difference time which the memory unit 412 (holding unit 506) holds (step Sb3).

The management controller 401 (the calculation unit 507) transmits the temporary system time to the UEFI service function unit (step Sb4).

A UEFI service function unit (determination unit 509) compares the system time of RTC 312 (second RTC 503) of the chipset 302 (backup chipset 502) and the temporary system time received from the management controller 401 (step Sb5). More specifically, the UEFI service function unit (determination unit 509) compares the absolute value of the difference (the difference time) between the system time of RTC 312 of the chipset 302 and the temporary system time received from the management controller 401 and the predetermined threshold value.

In the case that the absolute value of the difference between the system time of RTC 312 and the temporary system time received from the management controller 401 is no smaller than threshold value (YES of step Sb5), the UEFI service function unit (determination unit 509) judges that there is a estrangement between both time and the time correction is needed. Then, the UEFI service function unit (determination unit 509) instructs the management controller 401 (configuration unit 508) to write the temporary system time.

The management controller 401 (configuration unit 508) which receives the instructions writes the received temporary system time in RTC 312 (second RTC 503) of the chipset 302 (backup chipset 502) and restores the system time (step Sb6).

On the other hand, in the case that the absolute value of the difference between the system time of RTC 312 and the temporary system time received from the management controller 401 is less than the threshold value (NO of step Sb5), the UEFI service function unit (determination unit 509) judges that the time correction is not needed and finishes the processing.

Further, as already described, the information processing apparatus 101 of this exemplary embodiment does not need to include the determination unit 509 and may omit the judgment of step Sb5. In other words, the information processing apparatus 101 may always write the temporary system time in RTC 312 (second RTC 503) of the chipset 302 (backup chipset 502).

The information processing apparatus 101 of the exemplary embodiment mentioned above can get the effect which the system time between the RTCs built in the chipset is synchronized using simple constitutions.

And, the information processing apparatus 101 of the exemplary embodiment mentioned above does not need a manual synchronization and can be synchronized automatically.

The reason is as follows.

The difference time calculation unit 505 of the information processing apparatus 101 of this exemplary embodiment calculates the difference time of the system time of the first RTC 501 of the operational chipset 500 and the time which is timed of third RTC 504. Then, the calculation unit 507 calculates the temporary system time which is set to the second RTC 503 based on the time which is timed of the third RTC 504 and the difference time when the chipsets are switched. Then, the configuration unit 508 sets the temporary system time to the second RTC 503. It is due to these operations.

Further, it has been described that the information processing apparatus 101 of the exemplary embodiment mentioned above includes one of the CPU 201 and the chipset 302 of the backup resources. However, the information processing apparatus 101 of this exemplary embodiment does not need to limit to this. The information processing apparatus 101 may include no smaller than two of the CPUs 201 or the chipsets 302.

Alternatively, the information processing apparatus 101 may install the management controller 401 for each chipset (for example, in the case of the exemplary embodiment mentioned above, the information processing apparatus 101 may include two management controllers 401 for the chipset 301 and the chipset 302). Then, the information processing apparatus 101 may switch per set of the chipset and the management controller in the case of the switching. Further, when switching per set, the management controller 401 shares the time difference information using the communication between the management controllers.

The technologies on the patent documents 1-4 in relation to the present invention mentioned above can synchronize the time between the system (OS) and the application or two information processing apparatuses. And, the technology on the patent documents 1-4 can correct the time using an external server.

However, in the information processing apparatus including the indispensable chipset for the system operation, the technologies on the patent documents 1-4 does not disclose the situation in which the failure occurs in the operational chipset, the system is down, and the switching to the backup chipset occurs, and the technology of the time synchronization between the chipsets in the case that such situation has taken place. Therefore, the technologies on patent documents 1-4 have a problem that it is difficult to correspond to such situation.

When the failure occurs in the operational chipset and the system is down, the present invention can easily synchronize the time of the chipset of the backup resources to the system time.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An information processing apparatus comprising:
an operational chipset which includes a first Real Time Clock (RTC);
a backup chipset which includes a second RTC:
a third RTC which times system time;
a time difference calculation unit which calculates a time difference between a system time periodically notified of from said first RTC of said operational chipset and the system time which said third RTC times;
a holding unit which holds said time difference;
a calculation unit which calculates a temporary system time which is set to said second RTC of said backup chipset to which a chipset switching operated, based on the system time of said third RTC and said time difference at the time of the chipset switching; and
a configuration unit which sets said temporary system time to said second RTC of said backup chipset.

2. The information processing apparatus according to claim 1 further comprising:
a determination unit which compares the system time of said second RTC of said backup chipset and said temporary system time and determines whether the time difference is smaller than the predetermined threshold value at the time of the chipset switching; and
said configuration unit sets said temporary system time in said second RTC of said backup chipset in the case that said determination unit judges the time difference is not smaller than the predetermined threshold value.

3. The information processing apparatus according to claim 2, wherein
said configuration unit is a function unit which performs Unified Extensible Firmware Interface service.

4. The information processing apparatus according to claim 3, wherein
said first RTC receives the system time from said function unit which performs the Unified Extensible Firmware Interface service.

5. A system time synchronization method for a information processing apparatus comprising an operational chipset including a first RTC (Real Time Clock), a backup chipset including a second RTC, and a third RTC, comprising:
timing system time by the third RTC;
calculating a time difference between a system time periodically notified of from said first RTC of said operational chipset and the system time which said third RTC times;
holding said time difference;
calculating a temporary system time which is set to said second RTC of said backup chipset to which a chipset switching operated, based on the system time of said third RTC and said time difference at the time of the chipset switching; and
setting said temporary system time to said second RTC of said backup chipset.

6. A non-transitory computer readable medium embodying a program, said program causing a information processing apparatus comprising an operational chipset including a first RTC (Real Time Clock), a backup chipset including a second RTC, and a third RTC to perform method, said method comprising:
timing system time by the third RTC;
calculating a time difference between a system time periodically notified of from said first RTC of said operational chipset and the system time which said third RTC times;
holding said time difference;
calculating a temporary system time which is set to said second RTC of said backup chipset to which a chipset switching operated, based on the system time of said third RTC and said time difference at the time of the chipset switching; and
setting said temporary system time to said second RTC of said backup chipset.

* * * * *